United States Patent [19]
Myers

[11] Patent Number: 6,135,255
[45] Date of Patent: Oct. 24, 2000

[54] RESEALABLE ROLLER CLUTCH

[75] Inventor: W. Neill Myers, Huntsville, Ala.

[73] Assignee: The United States of America as represented by the Administrator of the National Aeronautics and Space Administration, Washington, D.C.

[21] Appl. No.: 09/207,710

[22] Filed: Dec. 9, 1998

[51] Int. Cl.[7] .............. F16D 11/06; F16D 13/04; F16D 15/00; F16D 23/00
[52] U.S. Cl. ............ 192/45; 192/41 R; 384/571
[58] Field of Search ............ 192/45, 45.1, 415, 192/30 R; 384/571

[56] References Cited

U.S. PATENT DOCUMENTS

| | | |
|---|---|---|
| 3,909,086 | 9/1975 | Keleshian .................. 308/233 |
| 4,046,436 | 9/1977 | Brown ....................... 308/233 |
| 4,271,949 | 6/1981 | Guerton et al. ............. 192/98 |
| 4,327,822 | 5/1982 | Vogele et al. .............. 192/41 A |
| 5,109,964 | 5/1992 | Fukui et al. ............... 192/48.92 |
| 5,372,227 | 12/1994 | Kinoshita et al. .......... 192/45 |
| 5,706,700 | 1/1998 | Takagi et al. .............. 74/7 |
| 5,921,685 | 7/1999 | Ishimaru et al. ........... 384/564 |

*Primary Examiner*—Charles A Marmor
*Assistant Examiner*—Tisha D. Waddell
*Attorney, Agent, or Firm*—Jerry L. Seemann

[57] ABSTRACT

A clutch that connects a first rotating member to a second rotating member in a manner that allows directional rotation between the two members in an engaged mode and free rotation between the members in a disengaged mode. The novelty of this invention lies in the combination of directional rotation (i.e., rotation in one direction) capability with free rotation (i.e., rotation in both directions) capability in a single device.

14 Claims, 7 Drawing Sheets

RESEALABLE ROLLER CLUTCH

ORIGIN OF THE INVENTION

The invention described in this patent was made by an employee of the United States Government and may be manufactured and used by or for the Government for governmental purposes without the payment of any royalties.

BACKGROUND OF THE INVENTION

1. Field of the Invention

In general, this invention pertains to devices for transferring torque between two rotating members. Specifically, this invention pertains to mechanical clutches that are used to connect two rotating members together.

2. Background Information

Mechanical clutches are well known in the prior art and can provide a variety of functions. A first type of mechanical clutch, which only operates in a single mode, allows directional rotation (i.e., rotation in one direction) between two rotating members. A second type of mechanical clutch locks two rotating members together when engaged and allows free rotation (i.e., rotation in both directions) between two rotating members when disengaged. Until now, there has not been a mechanical clutch that provides for both directional rotation of a first member relative to a second member when engaged and free rotation of a first member relative to a second member when disengaged.

SUMMARY OF THE INVENTION

This invention has the ability to connect a first rotating member to a second rotating member in a manner that allows directional rotation (i.e., rotation in one direction) between the two members in an engaged mode and free rotation (i.e., rotation in both directions) between the two members in a disengaged mode. The novelty of this invention lies in the combination of directional rotation capability with free rotation capability in a single device.

An object of this invention is to provide a mechanical clutch that allows directional rotation between two rotating members.

Another object of this invention is to provide a mechanical clutch that allows free rotation between two rotating members.

A further object of this invention is to provide a mechanical clutch that allows directional rotation in one mode and free rotation in another mode.

BRIEF DESCRIPTION OF THE DRAWINGS

The following discussion of the invention will refer to the accompanying drawings in which.

DESCRIPTION OF THE PREFERRED EMBODIMENT

Figure 1:
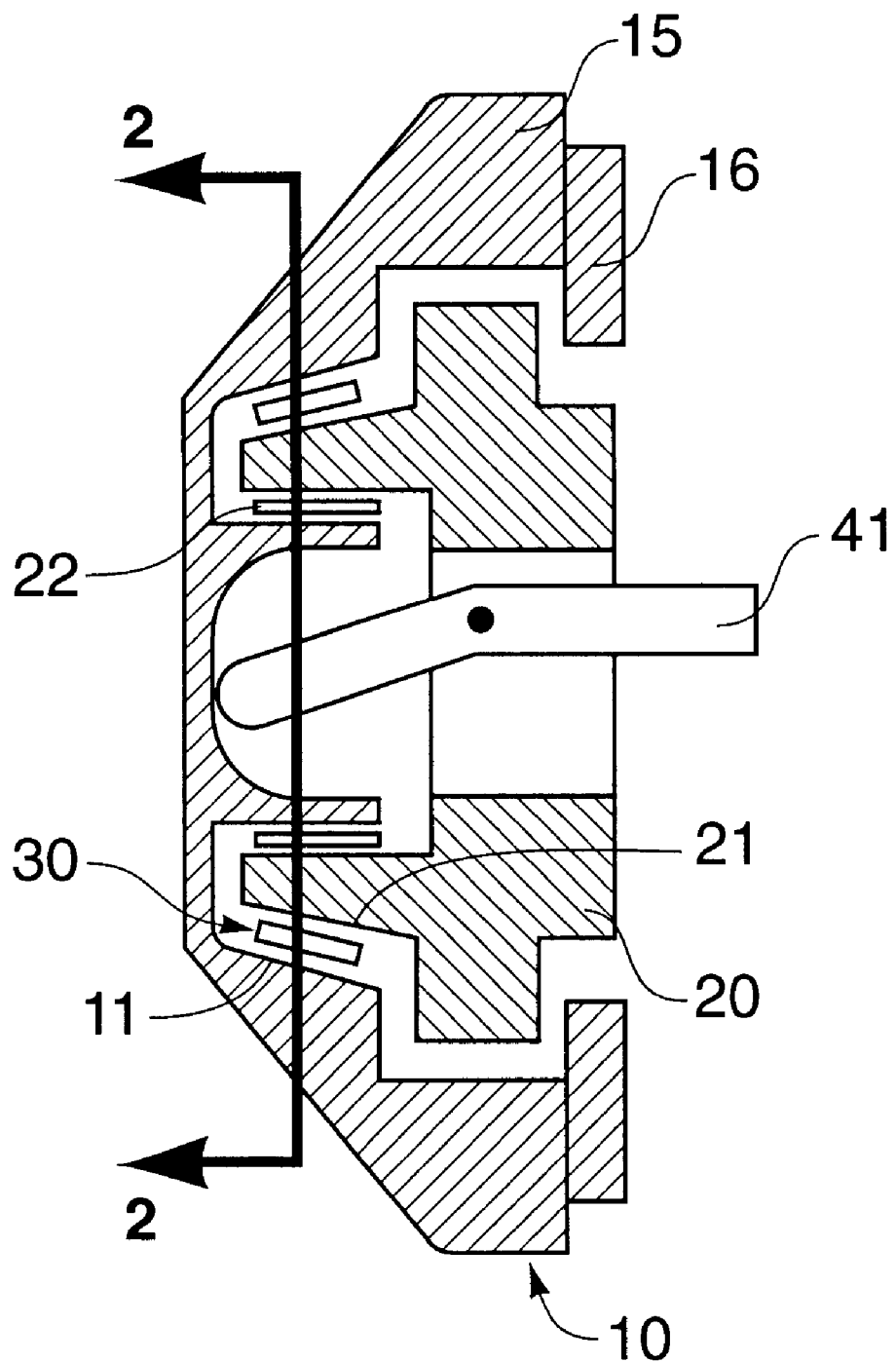
FIG. 1 represents a schematic, cross-sectional view of the releasable roller clutch.
Figure 2:
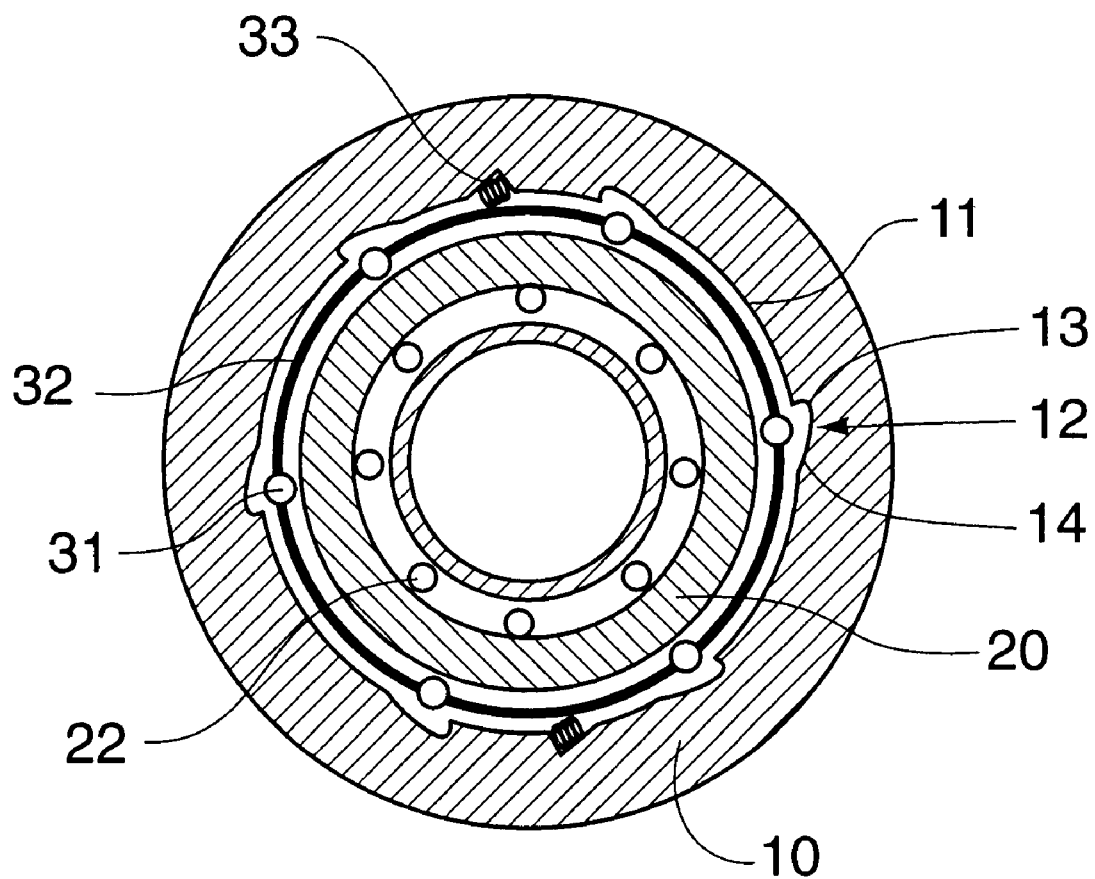
FIG. 2 represents another schematic, cross-sectional view of the releasable roller clutch taken along line 2—2 of FIGS. 1 and 6.

Referring to FIG. 1, a preferred embodiment of this invention comprises a first housing (10) with a first conical surface (11), a second housing (20) with a second conical surface (21), a roller (30), and a means for axially displacing the first conical surface relative to the second conical surface (41 or 42). Referring also to FIG. 2, the preferred embodiment of this invention also has a plurality of tapered pockets (12) in the first conical surface (11). The tapered pockets (12) have a deep portion (13) and a shallow portion (14).

The first housing (10) also consists of a first section (15) and a second section (16) fastened together in the preferred embodiment. Having the first housing (10) in two sections (15, 16) facilitates assembly and disassembly of the invention since the first housing (10) acts as an outer housing that encloses the second housing (20) or inner housing.

Figure 7:
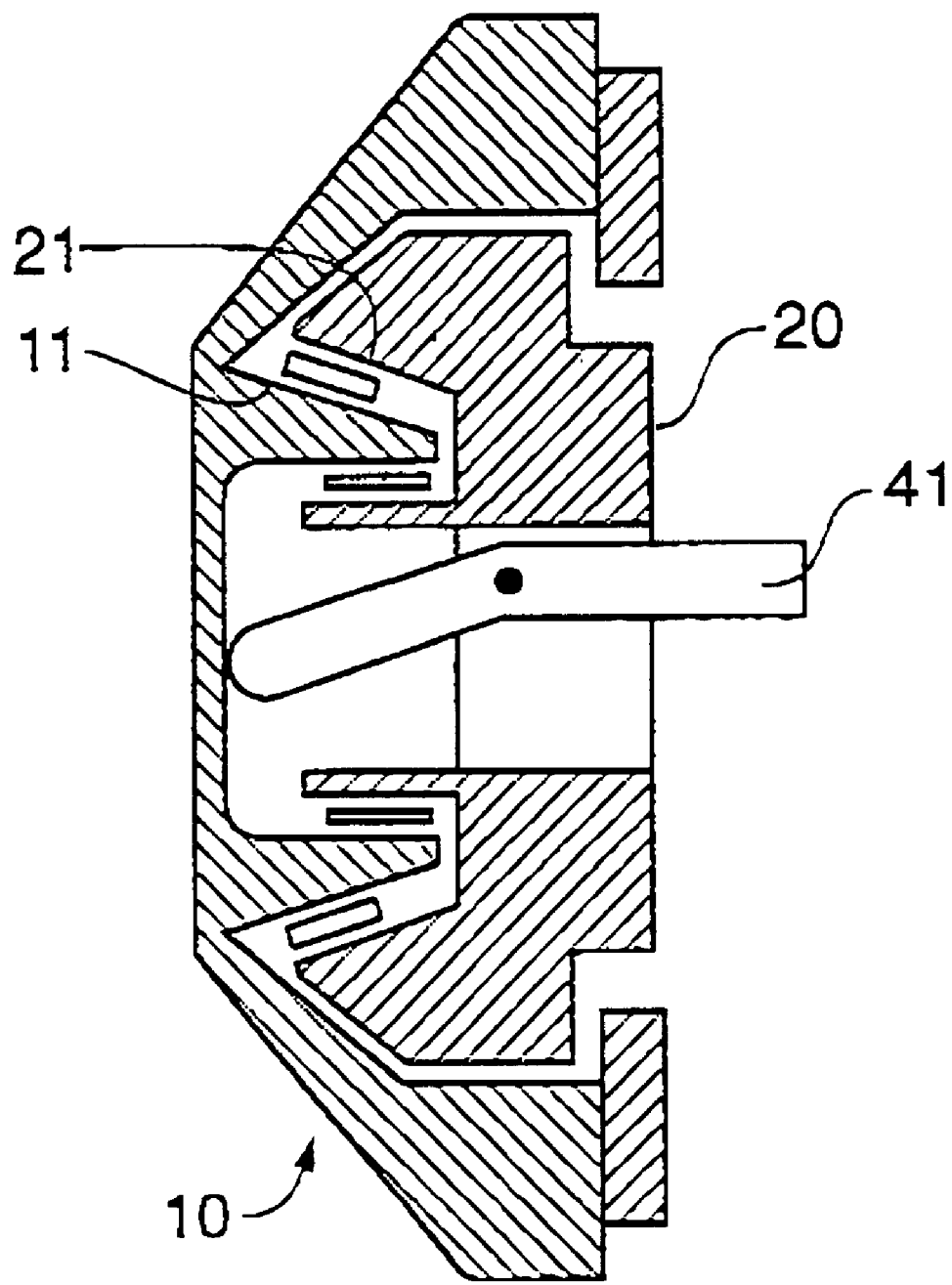
FIG. 7 represents an alternative embodiment to the bearing configuration associated with FIG. 1.

The second housing (20) is movably attached to the first housing (10) such that the second conical surface (21) can both rotate and be axially displaced relative to the first conical surface (11). The preferred embodiment uses a needle bearing (22) between the first housing (10) and the second housing (20) in order to achieve both rotation and axial displacement. While FIG. 1 shows the first conical surface (11) as an outer race and the second conical surface (21) as an inner race, the opposite arrangement would also work. In other words, the first conical surface (11) could be an inner race and the second conical surface (21) could be an outer race. This opposite arrangement is shown in FIG. 7.

In the preferred embodiment, the roller (30) consists of a plurality of needle-shaped elements (31) located in the tapered pockets (12) of the first conical surface (11) (See FIG. 2). In addition, the needle-shaped elements (31) are held in position with the use of a cage (32) retained between the first housing (10) and the second housing (20) and with the use of springs (33) that are compressed between the cage (32) and the first housing (10). The springs (33) bias the needle-shaped elements (31), via the cage (32), towards the deep portion (13) of the tapered pockets (12). Alternatively, ball-shaped elements can be substituted for needle-shaped elements.

Figure 6:
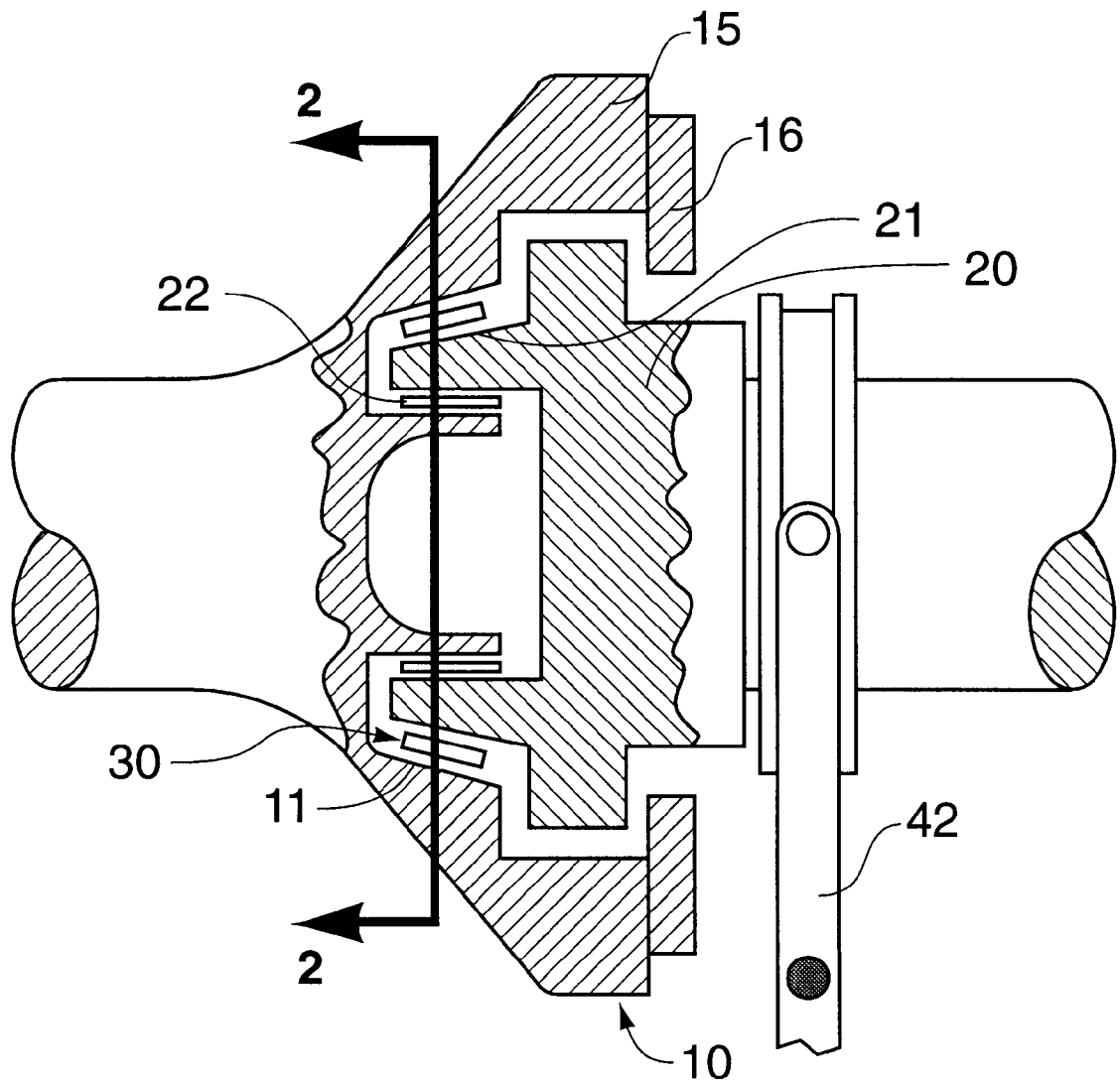
FIG. 6 represents a partial, cross-sectional view of an alternative embodiment of the releasable roller clutch.

Finally, the means for axially displacing the first conical surface relative to the second conical surface may consist of either a cam (41) as shown in FIG. 1 or a clutch fork (42) as depicted in the alternative embodiment of FIG. 6. The cam (41) is positioned between the first housing (10) and the second housing (20) such that rotation of the cam (41) provides axial displacement of the first conical surface (11) relative to the second conical surface (21). The cam (41) can be rotationally mounted to either the first housing (10) or the second housing (20). Alternatively, the clutch fork (42) simply displaces the first conical surface (10) relative to the second conical surface (20) much like a clutch fork on an automotive clutch.

Figure 3:
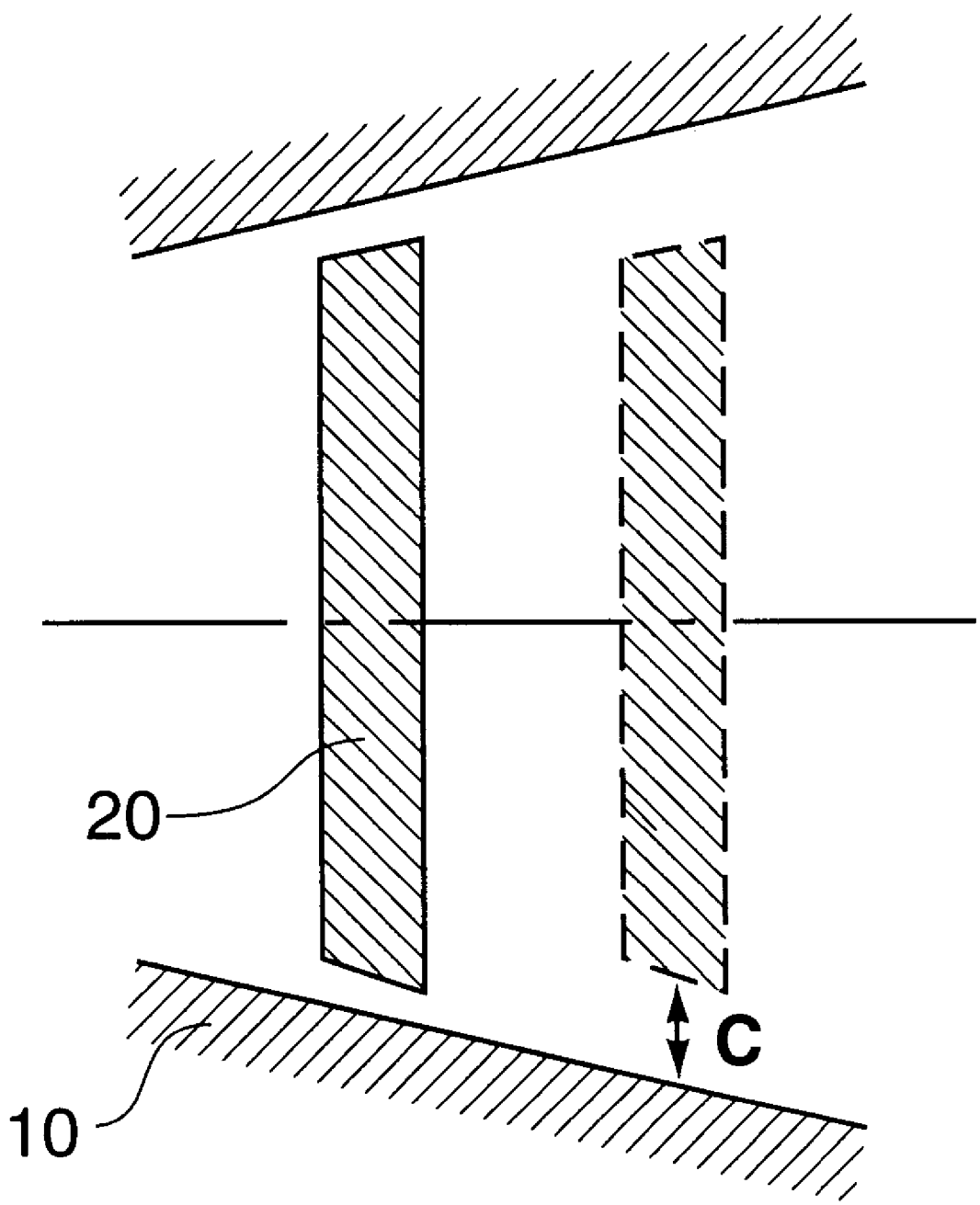
FIG. 3 demonstrates how axial displacement is used to change the clearance between two matching conical surfaces.

The operation of the invention is straightforward. When the first conical surface of the first housing is axially displaced away from the second conical surface of the second housing (i.e., when the clutch is disengaged), the roller allows either housing to move in either direction (i.e., clockwise or counterclockwise). When the cam moves the first and second housings together (i.e., when the clutch is engaged), the clearance (C) between the respective conical surfaces is reduced (see FIG. 3). As a result, the roller allows rotation in the direction that places the roller in the deep portion of the tapered pockets. In addition, the roller prevents rotation in the direction that places the roller in the shallow portion of the tapered pockets.

Figure 4:
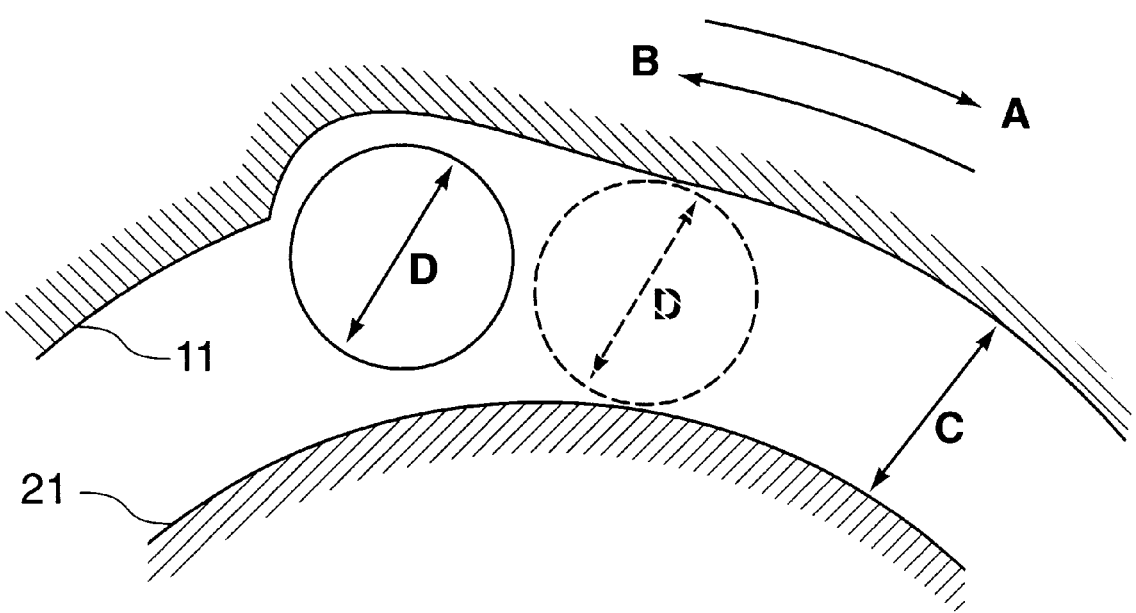
FIG. 4 demonstrates how the releasable roller clutch operates in the disengaged mode.
Figure 5:
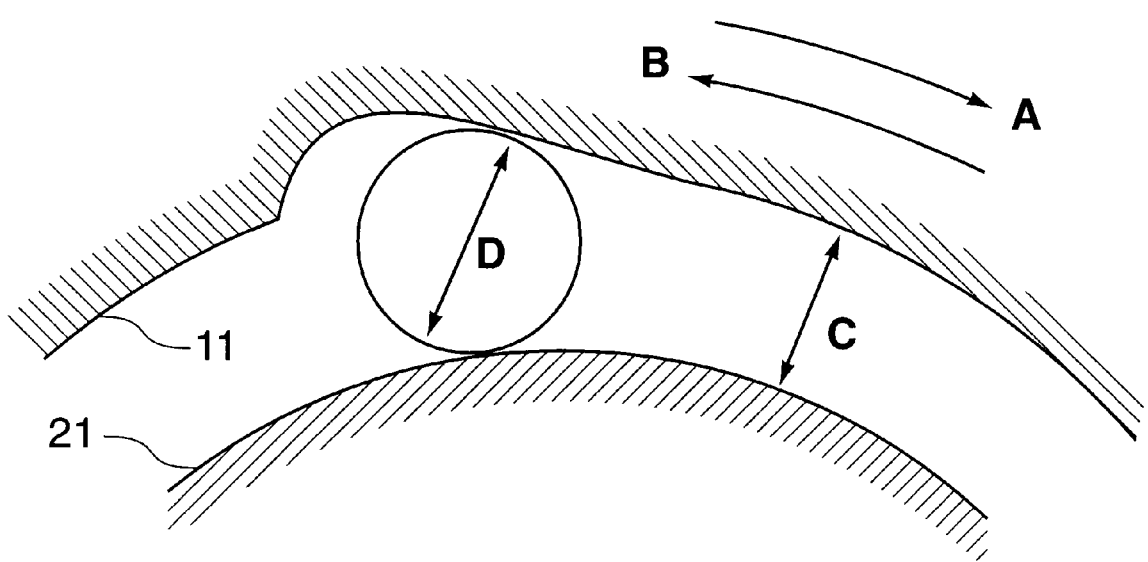
FIG. 5 demonstrates how the releasable roller clutch operates in the engaged mode.

The principle of operation of this invention can also be demonstrated by referring to FIGS. 4 and 5. FIG. 4 shows the clutch in a disengaged position. In this position, the roller is free to operate throughout the length of the tapered pocket even though the springs will bias the roller towards the deep portion of the tapered pocket. In other words, the minimum clearance between the first and second conical surfaces (C) is greater than the diameter (D) of the roller. Consequently, the first housing can rotate in either direction (A or B) relative to the second housing. FIG. 5 shows the clutch in an engaged position. In the engaged position, the roller is only free to operate at the deep end of the tapered pocket. In other words, the diameter (D) of the roller is greater than the minimum clearance (C) between the first and second conical surfaces. Consequently, the first housing can rotate in one direction (A) but not in the opposite direction (B) relative to the second housing. Rotation of the first housing in the opposite direction (B) is prevented because the roller becomes pinched between the first and second conical surfaces in the shallow portion of the tapered pocket.

In an alternative embodiment that also provides a different function, the tapered pocket is provided with a two-sided taper. In other words, the tapered pocket has a deep portion in the middle and a shallow portion on both sides of the deep portion. As a result, this alternative embodiment simply locks the two rotating members together when engaged and allows free rotation when disengaged.

What is claimed is:

1. An apparatus, comprising:
   a first housing having a first conical surface, said first conical surface also having a tapered pocket, said tapered pocket having a deep portion;
   a second housing having a second conical surface, said second housing is movably attached to said first housing such that said second conical surface can rotate and be axially displaced relative to said first conical surface;
   a roller located between said first conical surface and said second conical surface and also located within said tapered pocket of said first conical surface; and
   means for axially displacing said second conical surface of said second housing relative to said first conical surface of said first housing.

2. An apparatus, as recited in claim 1, wherein said first conical surface is an outer race and said second surface is an inner race.

3. An apparatus, as recited in claim 1, wherein said first conical surface is an inner race and said second surface is an outer race.

4. An apparatus, as recited in claim 1, wherein said first housing consists of a first section and a second section fastened together.

5. An apparatus, as recited in claim 1, wherein said first conical surface has a plurality of tapered pockets.

6. An apparatus, as recited in claim 5, wherein said roller consists of a plurality of needle-shaped elements.

7. An apparatus, as recited in claim 5, wherein said roller consists of a plurality of ball-shaped elements.

8. An apparatus, as recited in claim 1, wherein said means for axially displacing said second conical surface of said second housing relative to said first conical surface of said first housing comprises a cam rotationally mounted to said first housing.

9. An apparatus, as recited in claim 1, wherein said means for axially displacing said second conical surface of said second housing relative to said first conical surface of said first housing comprises a cam rotationally mounted to said second housing.

10. An apparatus, as recited in claim 1, wherein said means for axially displacing said second conical surface of said second housing relative to said first conical surface of said first housing comprises a clutch fork in which said first housing is free to rotate.

11. An apparatus, as recited in claim 1, wherein said means for axially displacing said second conical surface of said second housing relative to said first conical surface of said first housing comprises a clutch fork in which said second housing is free to rotate.

12. An apparatus, as recited in claim 1, further comprising a cage retained between said two housings for holding said roller within said tapered pocket of said first conical surface.

13. An apparatus, as recited in claim 1, further comprising a spring for biasing said roller towards said deep portion of said tapered pocket.

14. An apparatus, as recited in claim 1, wherein said tapered pocket also has a first shallow portion and a second shallow portion on both sides of said deep portion.

\* \* \* \* \*